United States Patent
Lienert et al.

(10) Patent No.: US 11,434,859 B2
(45) Date of Patent: Sep. 6, 2022

(54) CONNECTION PIECE FOR A HIGH-PRESSURE FUEL PUMP, AND HIGH-PRESSURE FUEL PUMP

(71) Applicant: Robert Bosch GmbH, Stuttgart (DE)

(72) Inventors: Edmund-Arnold Lienert, Moeglingen (DE); Florian Martin, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 134 days.

(21) Appl. No.: 16/625,567

(22) PCT Filed: May 14, 2018

(86) PCT No.: PCT/EP2018/062376
§ 371 (c)(1),
(2) Date: Dec. 20, 2019

(87) PCT Pub. No.: WO2019/007571
PCT Pub. Date: Jan. 10, 2019

(65) Prior Publication Data
US 2021/0324823 A1    Oct. 21, 2021

(30) Foreign Application Priority Data
Jul. 5, 2017  (DE) ............. 10 2017 211 434.7

(51) Int. Cl.
*F02M 55/00*       (2006.01)
*F16L 15/00*       (2006.01)
*F16L 25/14*       (2006.01)
(52) U.S. Cl.
CPC ......... *F02M 55/005* (2013.01); *F16L 15/006* (2013.01); *F16L 25/14* (2013.01)

(58) Field of Classification Search
CPC ..... F02M 55/005; F02M 55/004; F16L 25/14; F16L 41/008; F16L 41/005; F16L 41/001
See application file for complete search history.

(56) References Cited

U.S. PATENT DOCUMENTS 4,278,275 A * 7/1981 Diederich, Jr. ......... F16L 39/00
                                                    285/12
4,938,251 A * 7/1990 Furrow ................... F16L 39/02
                                                    137/269

(Continued)

FOREIGN PATENT DOCUMENTS

CN      2132902 Y    5/1993
DE      563 917 C    11/1932

(Continued)

OTHER PUBLICATIONS

International Search Report corresponding to PCT Application No. PCT/EP2018/062376, dated Jul. 17, 2018 (German and English language document) (7 pages).

*Primary Examiner* — David Bochna
(74) *Attorney, Agent, or Firm* — Maginot, Moore & Beck LLP

(57) ABSTRACT

A connection fitting for connecting an outlet of a high-pressure fuel pump to a high-pressure region of a fuel system of an internal combustion engine includes a first connection opening and a second connection opening. The first connection opening has a first opening axis and is configured to connect to the outlet of the high-pressure fuel pump. The second connection opening has a second opening axis and is configured to connect to the high-pressure region. The second opening axis is arranged non-coaxially to the first opening axis.

16 Claims, 2 Drawing Sheets

(56) References Cited

U.S. PATENT DOCUMENTS

| | | | |
|---|---|---|---|
| 6,352,067 B1 | 3/2002 | Genslak | |
| 6,983,762 B2 * | 1/2006 | Wheeler | F02M 69/54 |
| | | | 137/539 |
| 8,261,723 B2 * | 9/2012 | Parks | F02M 37/0052 |
| | | | 123/514 |
| 8,564,312 B2 * | 10/2013 | Nakamura | G01N 33/2852 |
| | | | 324/663 |
| 10,480,469 B2 * | 11/2019 | Di Domizio | F02M 55/005 |
| 2002/0053341 A1 | 5/2002 | Imura et al. | |
| 2005/0144558 A1 * | 6/2005 | Denton | F02M 55/025 |
| | | | 715/209 |
| 2005/0166902 A1 * | 8/2005 | Schmitt | F02M 37/0052 |
| | | | 123/514 |
| 2011/0012342 A1 * | 1/2011 | Harhoff | F02M 55/025 |
| | | | 285/201 |
| 2014/0000562 A1 * | 1/2014 | Eklund | F02M 55/005 |
| | | | 123/447 |
| 2016/0176491 A1 * | 6/2016 | Ito | F02M 37/007 |
| | | | 123/468 |
| 2017/0248107 A1 * | 8/2017 | Ellenberg | F02M 59/44 |

FOREIGN PATENT DOCUMENTS

| | | | | |
|---|---|---|---|---|
| DE | 27 05 489 A1 | | 8/1978 | |
| DE | 38 44 371 A1 | | 7/1990 | |
| DE | 103 61 573 A1 | | 7/2005 | |
| DE | 102012005921 A1 * | | 9/2013 | ........... B23K 33/006 |
| DE | 102015209263 B3 * | | 9/2016 | ........... F02M 55/005 |
| DE | 102017129332 A1 * | | 6/2019 | ............ E03C 1/042 |
| GB | 2 058 948 A | | 4/1981 | |
| WO | WO-2013117311 A1 * | | 8/2013 | ........... F02M 55/005 |
| WO | 2013/182213 A1 | | 12/2013 | |

\* cited by examiner

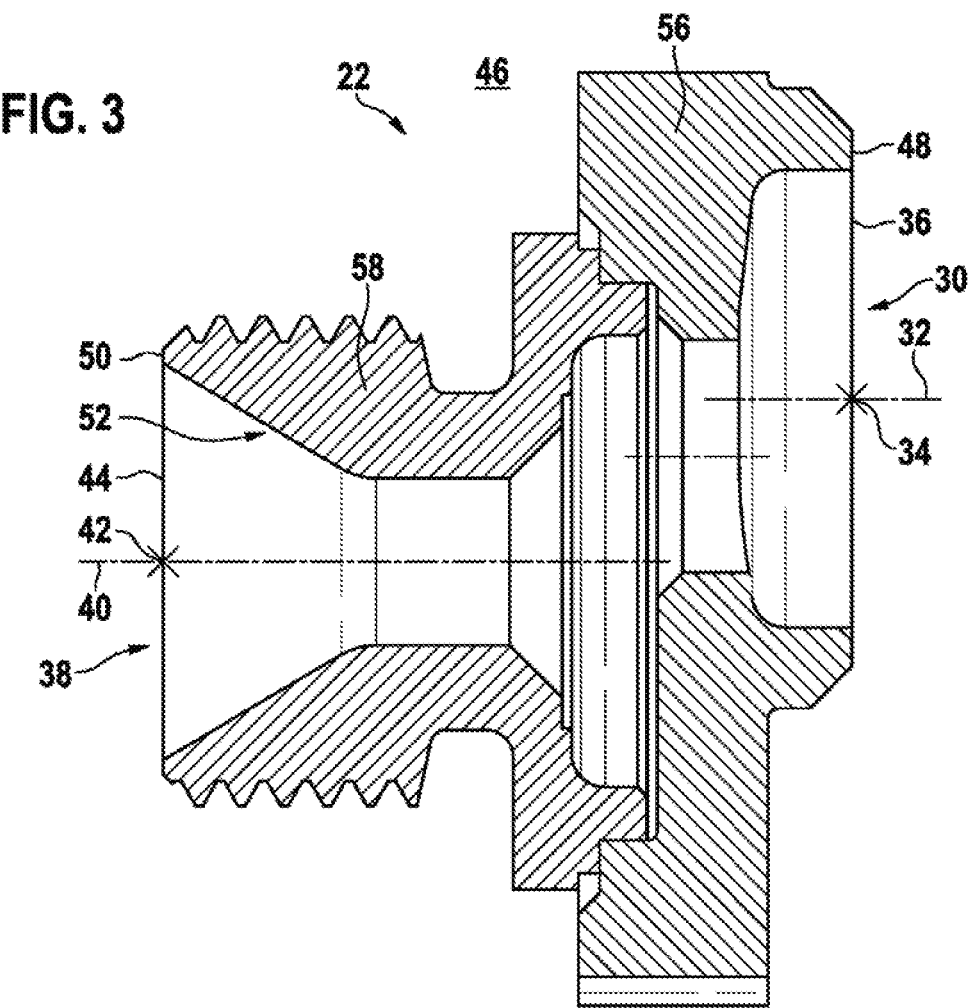

CONNECTION PIECE FOR A HIGH-PRESSURE FUEL PUMP, AND HIGH-PRESSURE FUEL PUMP

This application is a 35 U.S.C. § 371 National Stage Application of PCT/EP2018/062376, filed on May 14, 2018, which claims the benefit of priority to Serial No. DE 10 2017 211 434.7, filed on Jul. 5, 2017 in Germany, the disclosures of which are incorporated herein by reference in their entirety.

BACKGROUND

The disclosure relates to a connection fitting for connecting an outlet of a high-pressure fuel pump to a high-pressure region of a fuel system of an internal combustion engine, and a high-pressure fuel pump having a connection fitting.

High-pressure fuel pumps are used in fuel systems to compress fuel from an admission pressure prevailing in a low-pressure region to an injection pressure, which is required for fuel injection. Such high-pressure fuel pumps conventionally have at least one piston, which can conventionally be moved axially by a cam or an eccentric disk. As a result of the axial movement of the piston, during a suction stroke, fuel is suctioned from the low-pressure region into a feed chamber via a quantity control valve. During a feed stroke, the fuel is compressed in the piston chamber and supplied to an outlet of the high-pressure fuel pump via an outlet valve. A connection fitting is conventionally arranged at the outlet of the high-pressure fuel pump. The outlet of the high-pressure fuel pump is connected to a high-pressure region, conventionally comprising a rail, via the connection fitting.

SUMMARY

An object of the present disclosure is to provide a connection fitting which enables flexible use of the fuel pump. An object of the present disclosure is moreover to provide a flexibly usable high-pressure fuel pump.

This object is achieved by a connection fitting according to the disclosure and by a high-pressure fuel pump according to the disclosure. The connection fitting according to the disclosure has a first connection opening, which is provided for connecting to the outlet of the high-pressure fuel pump and has a first opening axis, and a second connection opening, which is provided for connecting to the high-pressure region and has a second opening axis, wherein the second opening axis is arranged non-coaxially to the first opening axis. As a result of the non-coaxial arrangement of the opening axes, a flexible spatial arrangement of the high-pressure fuel pump with respect to the high-pressure region, in particular the rail, is enabled. An offset or cross-wise arrangement between the alignment of the high-pressure region or the connection thereof and the alignment of the high-pressure fuel pump can be bridged, for example, by the connection fitting according to the disclosure. The connection of the high-pressure region and the outlet of the high-pressure fuel pump can also be arranged, for example, above one another or adjacent to one another with the same alignment or opening direction, wherein the two can be connected without difficulty by means of the connection fitting according to the disclosure. However, the first opening axis and the second opening axis can, for example, also extend such that they are skewed in relation to one another.

In this case, the opening axis of the respective connection openings is understand to be a straight line which extends through the area center of the respective opening area and is arranged orthogonally to the opening area.

In this case, a connection fitting is understand to be a component which is connected directly to the high-pressure fuel pump or to a housing of the high-pressure fuel pump. The connection fitting therefore adjoins the high-pressure fuel pump directly and forms the transition to the high-pressure region. The connection fitting preferably has connecting devices, for example designed as screw threads, in order to be connected to the housing of the high-pressure fuel pump and/or to the high-pressure region or to a high-pressure line or directly to the rail.

It is preferred if the first opening axis and the second opening axis lie in a plane. Certain transverse forces on the connections between the connection fitting and the high-pressure fuel pump or the high-pressure region (e.g. the rail) are thus prevented. Over a relative long operating period, such transverse forces can result in a leak at the connection fitting or place such a strain on possible threads of the connection fitting that the threads deform and lose their functional reliability.

In an advantageous embodiment, the second opening axis is arranged parallel to the first opening axis. Slanted positions and associated strains on the connection between the connection fitting and the fuel pump or the high-pressure region are thus eliminated.

It is also advantageous if the first connection opening and the second connection opening each lie on opposite sides of the connection fitting. In the intended assembly position, such a connection fitting is arranged spatially between the high-pressure pump and the high-pressure region, which has a positive effect on the useful life of the connection.

It is preferred if the second connection opening has a cross-section which widens along the second opening axis. The non-coaxial arrangement of the opening axes can result in undesired effects in terms of the flow mechanics, which can be reduced or compensated by the widening cross-section of the second connection opening.

It is advantageous if the first connection opening leads into the exterior of the connection fitting with a first opening area and the second connection opening leads into the exterior of the connection fitting with a second opening area, wherein the first opening area is larger than the second opening area. The connection fitting can thus be produced in a simple and therefore cost-effective manner, in spite of the non-coaxial arrangement of the opening axes.

In a preferred embodiment, the first connection opening and the second connection opening are arranged in a base body, formed in one piece, of the connection fitting, preferably wherein the connection fitting is formed in one piece. Such a connection fitting can be produced cost-effectively and a fluid-tight connection between the first connection opening and the second connection opening is always realized without difficulty.

As an alternative to the last-mentioned embodiment, it is preferred if the first connection opening is arranged in a first element of the fitting and the second connection opening is arranged in a separately manufactured second element of the fitting, which is preferably formed to be rotationally symmetrical, and the first element of the fitting is connected, preferably directly, to the second element of the fitting, in particular via a screw connection or a material-fitting connection, in particular a weld joint. Such an embodiment enables even complicated relative positions of the opening axes to be realized with little manufacturing effort. The first element of the fitting and/or the second element of the fitting can be produced separately from one another in a simple construction. For example, the connection openings can be designed as simple bores, and a desired and possibly complex non-coaxial position of the opening axes, which cannot be realized by boring procedures in a solid material, can still be realized by a corresponding connection of the two elements of the fitting. Such an embodiment moreover has the advantage that the first element of the fitting can be designed to be combinable with different second elements of the fitting in order to realize a variable connection fitting.

A high-pressure fuel pump for a fuel system of an internal combustion engine is also included within the disclosure, wherein the high-pressure fuel pump comprises a connection fitting which corresponds to one or more of the above-mentioned embodiments and is mounted at the outlet of the high-pressure fuel pump and is connectable to the high-pressure region of the fuel system.

BRIEF DESCRIPTION OF THE DRAWINGS

Further features, possible applications and advantages of the disclosure are revealed in the description below of exemplary embodiments of the disclosure, which are explained with reference to the drawings, wherein the features may be important to the disclosure both in isolation and in different combinations, without referring explicitly thereto again. The drawings show:

FIG. 3 a sectional illustration of a further embodiment of a connection fitting according to the disclosure.

DETAILED DESCRIPTION

Figure 1:
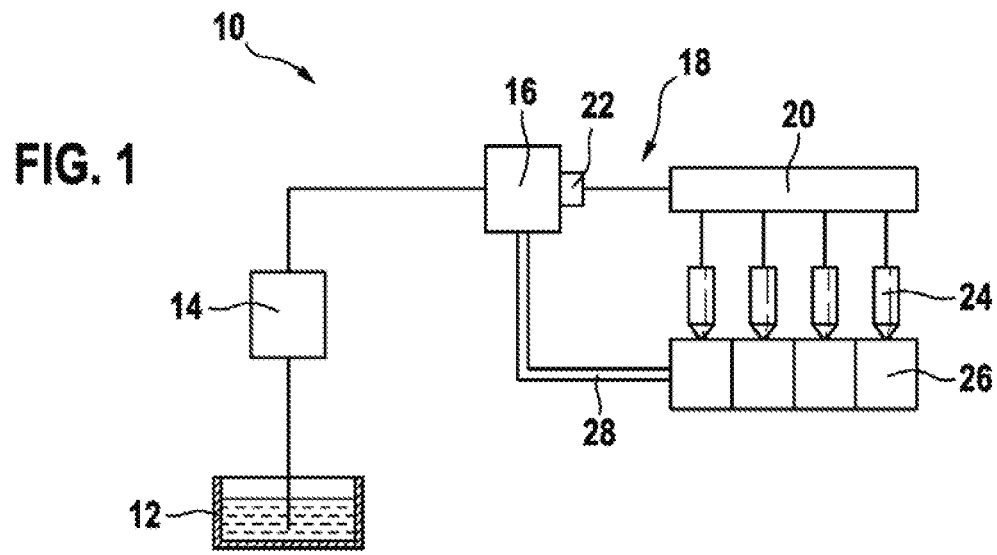
FIG. 1 a schematic illustration of a fuel system of an internal combustion engine having a high-pressure fuel pump formed as a piston pump.

A fuel system is denoted as a whole by the reference sign 10 in FIG. 1. It comprises a fuel container 12, which contains fuel and from which a pre-feed pump 14 feeds the fuel to a high-pressure fuel pump 16 formed as a piston pump. The high-pressure fuel pump 16 compresses the fuel to a pressure level which is sufficiently high for injection and feeds it to a high-pressure region 18, which comprises a fuel rail 20. A connection fitting 22 is arranged at the transition between the high-pressure fuel pump 16 and the high-pressure region 18.

A plurality of injectors 24 are connected to the fuel rail 20. The injectors 24 inject the fuel directly into combustion chambers 26 associated therewith. As indicated by the connection 28, the high-pressure fuel pump 16 designed as a piston pump is mechanically driven by an internal combustion engine, which comprises the combustion chambers 26.

Figure 2:
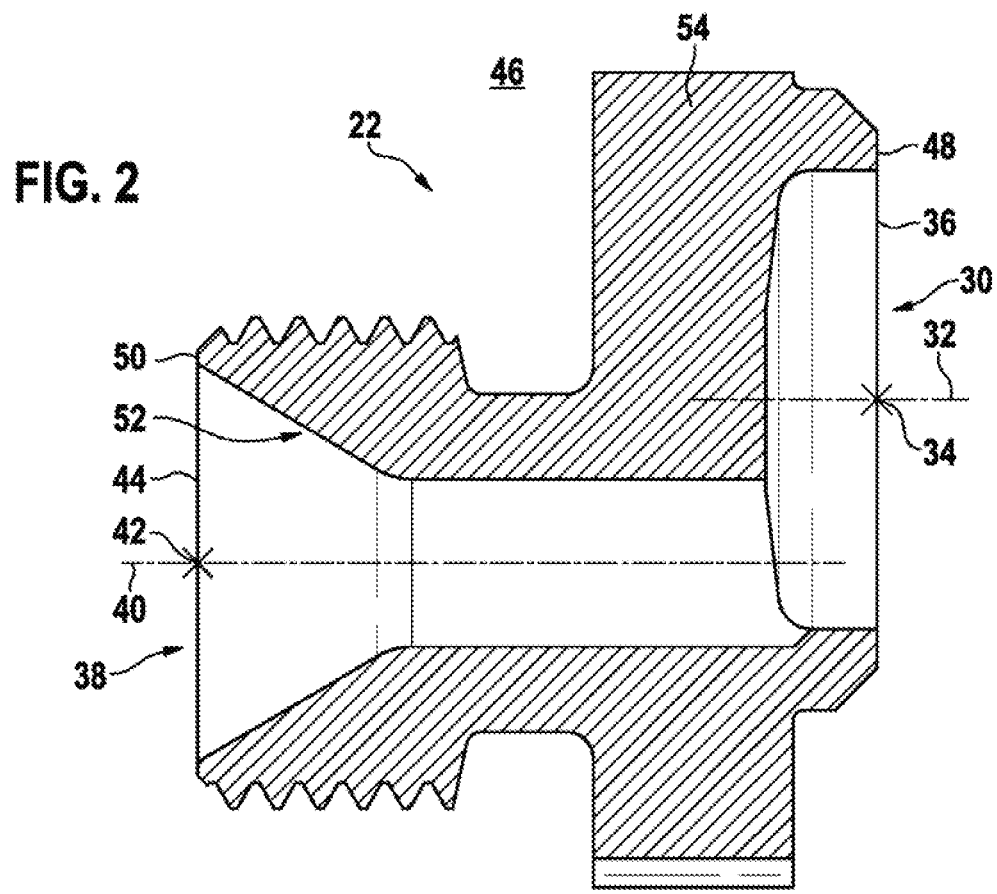
FIG. 2 a sectional illustration of an embodiment of a connection fitting according to the disclosure.

In FIG. 2, the connection fitting 22 is shown in detail in a sectional view. The connection fitting 22 has a first connection opening 30, which is provided for connecting to the outlet of the high-pressure fuel pump 16. The first connection opening 30 has a first opening axis 32. In this case, the first opening axis 32 of the first connection opening 30 corresponds to a straight line, which extends through a first area center 34 (denoted by a cross) of the first opening area 36, wherein the first opening axis 32 is arranged orthogonally to the first opening area 36.

The connection fitting 22 also has a second connection opening 38, which is provided for connecting to the high-pressure region 18. The second connection opening 38 has a second opening axis 40. In this case, the second opening axis 40 of the second connection opening 38 corresponds to a straight line, which extends through a second area center 42 (denoted by a cross) of the second opening area 44, wherein the second opening axis 40 is arranged orthogonally to the second opening area 44. The respective opening areas 36 and 44 of the connection openings 30 and 38 refer to the clear areas with which the connection openings 30 and 38 lead into the exterior of the connection fitting 22.

The second opening axis 40 is arranged non-coaxially to the first opening axis 32. The second opening axis 40 lies with the first opening axis 32 in a plane 46 which corresponds to the section plane of FIG. 2. The second opening axis 40 is also arranged parallel to the first opening axis 32.

The first connection opening 30 lies on a first side 48 of the connection fitting 22. A second side 50 of the connection fitting 22 lies opposite the first side 48 of the connection fitting 22. The second connection opening 38 is arranged on the second side 50 of the connection fitting 22.

The second connection opening 38 has a cross-section 52 which widens along the second opening axis 40.

In the embodiment of the connection fitting 22 which is shown in FIG. 2, the first connection opening 30 and the second connection opening 38 are arranged in a base body 54, formed in one piece, of the connection fitting 22. In the present case, the base body 54 of the connection fitting 22 forms the connection fitting 22, meaning that the connection fitting 22 does not comprise further component parts attached to the base body 54.

An alternative embodiment of the connection fitting 22 according to the disclosure is illustrated in FIG. 3. The connection fitting 22 of FIG. 3 is constructed similarly to the connection fitting 22 of FIG. 2. However, the connection fitting 22 of FIG. 3 differs from the connection fitting 22 of FIG. 2 in that it does not comprise a base body 54 formed in one piece. Instead of the base body 54 formed in one piece, the connection fitting 22 of FIG. 3 comprises a first element 56 of the fitting and a second element 58 of the fitting.

The first element 56 of the fitting comprises the first connection opening 30, whilst the second element 58 of the fitting comprises the second connection opening 38. The first element 56 of the fitting is manufactured separately from the second element 58 of the fitting. In the present case, the second element 58 of the fitting is formed to be rotationally symmetrical. However, this rotationally symmetrical form is not compulsory. To form the connection fitting 22, the two elements 56, 58 of the fitting are connected to one another. In the present case, the two elements 56, 58 of the fitting are screwed to one another. However, the two elements 56, 58 of the fitting can also be connected to one another in another fluid-tight manner, for example they can be welded to one another.

The invention claimed is:

1. A fuel system of an internal combustion engine comprising:
    a fuel tank;
    a pre-feed pump;
    a high-pressure pump to which the pre-feed pump delivers fuel from the fuel tank, the high-pressure pump configured as a piston pump that pumps the fuel at an injection pressure to a high-pressure region, which includes a fuel rail and a plurality of injectors configured to inject the fuel into combustion chambers of the internal combustion engine, the high-pressure fuel pump being mechanically driven by the internal combustion engine, the high-pressure fuel pump including a pump outlet; and a connection fitting that connects the pump outlet to the high-pressure region, the connection fitting comprising:
- a first connection opening connected to the pump outlet of the high-pressure fuel pump, the first connection opening having a first opening axis; and
- a second connection opening connected to the high-pressure region, the second connection opening having a second opening axis that is arranged non-coaxially to and parallel to the first opening axis, wherein the connection fitting is connected directly to the high-pressure fuel pump or to a housing of the high-pressure fuel pump, and wherein the first connection opening leads into an exterior of the connection fitting with a first opening area, the second connection opening leads into the exterior of the connection fitting with a second opening area, and the first and second opening areas overlap one another when viewed along the first opening axis.

2. The fuel system as claimed in claim 1, wherein the first opening axis passes through the second opening area, and/or the second opening axis passes through the first opening area.

3. A high-pressure fuel pump for a fuel system of an internal combustion engine, comprising:
- a pump outlet;
- a connection fitting mounted at the pump outlet of the high-pressure fuel pump and configured to connect to a high-pressure region of the fuel system, the connection fitting comprising:
  - a first connection opening connected to the pump outlet, the first connection opening having a first opening axis; and
  - a second connection opening configured to connect to the high-pressure region, the second connection opening having a second opening axis that is arranged non-coaxially to the first opening axis, wherein the connection fitting is connected directly to the high-pressure fuel pump or to a housing of the high-pressure fuel pump, and wherein the first connection opening leads into an exterior of the connection fitting with a first opening area, the second connection opening leads into the exterior of the connection fitting with a second opening area, and the first and second opening areas overlap one another when viewed along the first opening axis.

4. The high-pressure fuel pump as claimed in claim 3, wherein the first opening axis and the second opening axis lie in a plane.

5. The high-pressure fuel pump as claimed in claim 3, wherein the second opening axis is arranged parallel to the first opening axis.

6. The high-pressure fuel pump as claimed in claim 3, wherein the first connection opening and the second connection opening each lie on opposite sides of the connection fitting.

7. The high-pressure fuel pump as claimed in claim 3, wherein the second connection opening has a cross-section that widens along the second opening axis.

8. The high-pressure fuel pump as claimed in claim 3, wherein the first connection opening leads into an exterior of the connection fitting with a first opening area, wherein the second connection opening leads into the exterior of the connection fitting with a second opening area, and wherein the first opening area is larger than the second opening area.

9. The high-pressure fuel pump as claimed in claim 3, wherein the first connection opening and the second connection opening are arranged in a base body of the connection fitting, and the base body is formed in one piece.

10. The high-pressure fuel pump as claimed in claim 9, wherein the connection fitting is formed in one piece.

11. The high-pressure fuel pump as claimed in claim 3, wherein the first connection opening is arranged in a first element of the connection fitting and the second connection opening is arranged in a separately-manufactured second element of the connection fitting, and wherein the first element is connected to the second element.

12. The high-pressure fuel pump as claimed in claim 11, wherein second element is rotationally symmetrical.

13. The high-pressure fuel pump as claimed in claim 11, wherein the first element is connected to the second element via a screw connection or a fluid-tight connection.

14. The high-pressure fuel pump as claimed in claim 13, wherein the fluid-tight connection is a fluid-tight, material-fitting connection.

15. The high-pressure fuel pump as claimed in claim 11, wherein the first element is connected to the second element via a weld joint.

16. The high-pressure fuel pump as claimed in claim 3, wherein the first opening axis passes through the second opening area, and/or the second opening axis passes through the first opening area.

* * * * *